Patented Dec. 8, 1925.

1,564,825

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR VULCANIZING RUBBER AND PRODUCTS OBTAINED THEREBY.

No Drawing. Original application filed May 15, 1922, Serial No. 561,022. Divided and this application filed August 6, 1925. Serial No. 48,664.

*To all whom it may concern:*

Be it known that I, SIDNEY M. CADWELL, a citizen of the United States, residing in Leonia, county of Bergen, State of New Jersey, have invented certain new and useful Improvements in Processes for Vulcanizing Rubber and Products Obtained Thereby, of which the following is a full, clear, and exact description.

This invention relates to the acceleration of vulcanization of rubber and more particularly to acceleration by organic substances containing sulphur.

One object of the invention is to provide a simple and inexpensive process of the kind mentioned employing accelerators which may be easily procured from inexpensive raw materials and which constitute stable and odorless compounds. Another object of the invention is to provide a series of products having high tensile strength, resistance to ageing, resistance to flexing and other desirable physical characteristics.

The invention accordingly consists in a process for vulcanizing rubber or similar materials which comprises combining a vulcanizing agent with rubber and thioaldehyde, and vulcanizing the rubber. It also includes combining with rubber a vulcanizing agent, an aldehyde and an alkaline nitrogenous body, and vulcanizing the rubber. It also includes products therefrom.

This application is a division of my copending application Serial No. 561,022, filed May 15. 1922.

In carrying out the invention in one form 100 parts of rubber or similar material, 10 parts of zinc oxide, 3 parts of sulphur and 3 parts of para chlorthiobenzaldehyde are mixed by milling in the usual manner at an elevated temperature and cured in a mold by steam at a pressure of 40 lbs. per square inch for 60 minutes at the end of which time vulcanization is complete.

It has been found that acceleration by this class of substances is more readily effected in the presence of certain metals in combination which may be generally designated as M. These metals include zinc, mercury, preferably in the mercuric state, lead, preferably in the plumbous state, cadmium, copper, preferably in the cupric state, arsenic, preferably in the arsenous state, manganese, preferably in the manganous state. These metals may be present as their oxides whose general formula is $M_xO_y$. The metals may be present in the form of their salts or other compounds.

Para chlororthiobenzaldehyde may be prepared in any desired manner. Preferably it is formed by passing hydrogen sulphide into an alcoholic solution of para chlorbenzaldehyde and collecting the white precipitate which is produced. It is a practically odorless white solid, melting at 74 to 84° C.

In general members of this class of compounds are prepared by treating aldehydes, preferably with hydrogen sulphide in neutral or basic solution. Acceleration by members of this class formed by treatment of the corresponding aldehydes with hydrogen sulphide in acid solution have been found to be less rapid than those formed in neutral or basic solution. Certain members of the class that are formed in neutral or basic solution are preferably employed with a base to provide rapid acceleration. As an illustration 2 parts of aniline may be included in the composition given in the above example. The stock will vulcanize completely in a mold under 40 lbs. steam pressure in less than 60 min. It will be understood that other amines than aniline, either aromatic or aliphatic may be employed in place thereof. The compound may be treated with aniline by supplying the latter in vapor form or by painting, as described in my copending application Serial No. 561,022, filed May 15, 1922.

Other members of this group of compounds are as follows: Thioheptaldehyde, thiobenzaldehyde, thiochloral, thiofurfuraldehyde, thiocinnamylaldehyde, para dimethylaminothiobenzaldehyde, para chlorthiobenzaldehyde, orthochlorthiobenzaldehyde, meta nitrothiobenzaldehyde.

These substances have all been employed in the vulcanization of rubber in accordance with the invention, and have been found to produce satisfactory vulcanization.

These aldehydes may be employed in their simple form or in the form of their polymers or as a mixture of the simple form and polymer and the same is true of the other members of the group. The above compounds are examples of alkylated and arylated thioaldehydes and may be most conveniently described as Al-CSH and Ar-CSH where Al and Ar represent alkyl and aryl groups respectively. In the above list the first and third mentioned compounds are alkylated thioaldehydes, the second, fourth, fifth and the following compounds are illustrative of arylated thioaldehydes.

Although mixing of the rubber and vulcanizing ingredients is carried out by milling as indicated above, it will be understood that various other methods of compounding rubber with vulcanizing ingredients may be employed. Instead of milling together the rubber and vulcanizing ingredients simultaneously as above set forth, the procedures given in my copending application Serial No. 441,691, filed February 1, 1921, may be employed.

The process employing the accelerators mentioned is a simple and inexpensive one. The accelerators themselves it will be observed can be prepared generally from inexpensive raw materials. The acceleration accomplished is rapid. Many of the accelerators and products therefrom are substantially odorless and the accelerators themselves are generally stable substances. Many of the vulcanized rubber products have good resistance to ageing and flexing.

It is to be understood that rubber substitutes, balata, gutta percha, etc., may be similarly treated instead of rubber and it is intended to cover such processes in the claims.

It will thus be seen that among others the objects of the invention above set forth are achieved.

Having thus described my invention, what I claim and desire to protect by Letters Patent is:

1. A process for vulcanizing rubber which comprises combining a vulcanizing agent with rubber and an arylated thioaldehyde, and vulcanizing the rubber.

2. A process for vulcanizing rubber which comprises combining a vulcanizing agent with rubber and an arylated thioaldehyde in the presence of a combined metal M, and vulcanizing the rubber.

3. A process for vulcanizing rubber which comprises combining a vulcanizing agent with rubber and parachlorthiobenzaldehyde, and vulcanizing the rubber.

4. A process for vulcanizing rubber which comprises combining with rubber sulphur and parachlorthiobenzaldehyde, and vulcanizing the rubber.

5. A process for vulcanizing rubber which comprises combining 100 parts of rubber, 10 parts of zinc oxide, 3 parts of sulphur and 3 parts of para chlorthiobenzaldehyde, and vulcanizing the rubber at a temperature corresponding to that of steam under approximately 40 lbs. steam pressure for approximately 30 minutes.

6. A vulcanized rubber derived from rubber combined with a vulcanizing agent, and an arylated thioaldehyde.

7. A vulcanized rubber derived from rubber combined with a vulcanizing agent and an arylated thioaldehyde in the presence of a combined metal M.

8. A vulcanized rubber derived from rubber combined with a vulcanizing agent and parachlorthiobenzaldehyde.

9. A vulcanized rubber derived from rubber combined with sulphur and parachlorthiobenzaldehyde.

10. A rubber vulcanized at a temperature corresponding to that of steam under approximately 40 lbs. steam pressure for approximately 30 minutes derived from rubber combined with 10 parts of zinc oxide, 3 parts of sulphur and 3 parts of parachlorthiobenzaldehyde.

11. A process for vulcanizing rubber which comprises treating rubber with sulphur, an aryl thioaldehyde, and a nitrogenous compound containing replaceable hydrogen, and vulcanizing the rubber.

12. A process for vulcanizing rubber which comprises treating rubber with sulphur, an aryl thioaldehyde, and an amine containing replaceable hydrogen, and vulcanizing the rubber.

13. A process for vulcanizing rubber which comprises treating rubber with sulphur, an aryl thioaldehyde, and an aromatic amine containing replaceable hydrogen, and vulcanizing the rubber.

14. A process for vulcanizing rubber which comprises treating rubber with sulphur, para chlor thiobenzaldehyde, and aniline, and vulcanizing the rubber.

Signed at New York, New York, this 31st day of July, 1925.

SIDNEY M. CADWELL.